United States Patent [19]
Yonemura et al.

[11] Patent Number: 5,539,558
[45] Date of Patent: Jul. 23, 1996

[54] SYSTEM OF DETECTING TROUBLES OF AN OPTICAL COMMUNICATION LINE

[75] Inventors: Ryugen Yonemura; Takanori Sawai, both of Osaka; Nobuyuki Kobayashi; Hayato Yuuki, both of Yokkaichi, all of Japan

[73] Assignees: Sumitomo Electric Industries, Ltd., Osaka; Sumitomo Wiring Systems, Ltd., Yokkaichi, both of Japan

[21] Appl. No.: 441,316

[22] Filed: May 15, 1995

[30] Foreign Application Priority Data

May 17, 1994 [JP] Japan ................................ 6-128318

[51] Int. Cl.⁶ .................... H04B 10/08; G02B 6/26; G02B 6/42
[52] U.S. Cl. ..................... 359/110; 359/109; 385/30; 385/31; 385/39
[58] Field of Search ................................. 359/110, 109, 359/127, 128, 138, 139; 385/20, 42, 43, 46, 48, 30, 31, 39

[56] References Cited

U.S. PATENT DOCUMENTS

| | | | |
|---|---|---|---|
| 4,796,968 | 1/1989 | Coccoli et al. | 385/42 |
| 4,917,456 | 4/1990 | Jahns et al. | 359/109 |
| 5,010,542 | 4/1991 | Pfaff | 359/109 |
| 5,018,129 | 5/1991 | Netravali et al. | 359/109 |
| 5,175,778 | 12/1992 | Nourshargh et al. | 385/42 |
| 5,335,104 | 8/1994 | Johnson | 359/110 |

OTHER PUBLICATIONS

Patent Abstracts of Japan, vol. 13, No. 126 (E–734), 1989 & JP–A–63 294023 (Thoshiba).
Payne et al, "Transparent Single–Mode Fiber Optical Networks", Journal of Lightwave Technology, vol. LT–4, No. 7, Jul. 1986, pp. 864–869.

Primary Examiner—Leo Boudreau
Assistant Examiner—Bhavesh Mehta
Attorney, Agent, or Firm—Cushman, Darby & Cushman

[57] ABSTRACT

A system of detecting an occurrence of a trouble in an optical communication line having a plurality of nodes with a sending port and a receiving port, a plurality of 2-input & 2-output couplers and fibers connecting the nodes and the couplers for distributing any signal issued from a node to all the nodes. The coupler has an intersecting allocation between two inputs and two outputs. The intersection in the coupler makes the recurring signal pass only through a series of evanescent linkages of the couplers to the receiving port of the same node. When a trouble arises, the evanescent linkage is more likely to be broken down than the direct linkage and the node notices the trouble by the extinction of the recurring signal.

10 Claims, 7 Drawing Sheets

Fig.7 sending port of a current node receiving port of the current node

Fig.8 sending port of a current node receiving port of the current node

Fig.9 sending port of a current node receiving port of the current node

Fig.10 sending port of a node receiving port of the same node

Fig.11 sending port of a node receiving port of the same node

Fig.12 receiving port of the same node sending port of a node

Fig.13 sending port of a node receiving port of the same node

SYSTEM OF DETECTING TROUBLES OF AN OPTICAL COMMUNICATION LINE

FIELD OF THE INVENTION

This invention relates to a system of detecting troubles of an optical communication line. An optical communication line is an assembly of transmission paths connecting a plurality of stations (nodes) having a receiving port and a sending port by optical fibers. The transmission of signals is carried out by sending optical signals in the optical fiber from the sending ports of some nodes to the receiving ports of other nodes. A plurality of couplers are interposed in the optical communication paths for dividing or unifying optical signals. In general, a coupler means a device for unifying more than two optical fibers together. Thus a coupler which connects n fibers with each other has symmetrically n inputs and n outputs on both sides. A signal from an input is equally divided by n, and is distributed into all the n outputs. The coupler is called an n:n coupler.

Here the optical communication line includes only the simple 2:2 couplers which unify two optical fibers and have two inputs and two outputs. The troubles of the optical communication line include the breakdown of optical fibers and the disorder of couplers. This invention proposes a system or a method of detecting the disorder of fiber couplers.

BACKGROUND OF THE INVENTION

This application claims the priority of Japanese Patent Application No. 128318/1994 filed on May 17, 1994 which is incorporated herein by reference. An optical fiber coupler is a device which is produced by joining a plurality of optical fibers at their middle and has a plurality of inputs and outputs symmetrically and a joined middle part. The coupler distributes a signal from an input to all the outputs. An M:M coupler is made by melting and joining M fibers at the middle. Thus the coupler has M inputs and M outputs reciprocally and a unified part. A signal of an arbitrary input is equally divided into M outputs. A coupler which unifies a plurality of fibers into a single joined part is called a star coupler. The unified part or joined part is produced by bringing the sides of a portion of fibers into contact with each other, heating the contacting portions, melting, and unifying the portions into one. The joined part of the fibers is then stretched. The distances between the cores of two fibers become very short by the stretching. The extreme approach of two cores makes an evanescent coupling between the cores. Thus a signal is exchanged among the fibers. An M:M coupler which has joined M fibers must distribute an arbitrary signal in a fiber to M fibers with an equal power. If a coupler is in trouble, some signal from a sending port is not transmitted to some receiving ports. There has been no system having such a node capable of detecting the troubles of couplers by itself till now. This invention suggests a system which can detect the faults of couplers in the case of the simple 2:2 couplers.

PROBLEMS TO BE SOLVED

If there happens such a trouble that a part of the joining portion of a fiber coupler is separated and some signal is not exchanged between some fibers, some transmission among confined nodes (stations) will be stopped but the other transmission among other nodes will still remain active. Thus it is difficult to detect the occurrence of the trouble.

Figure 1:
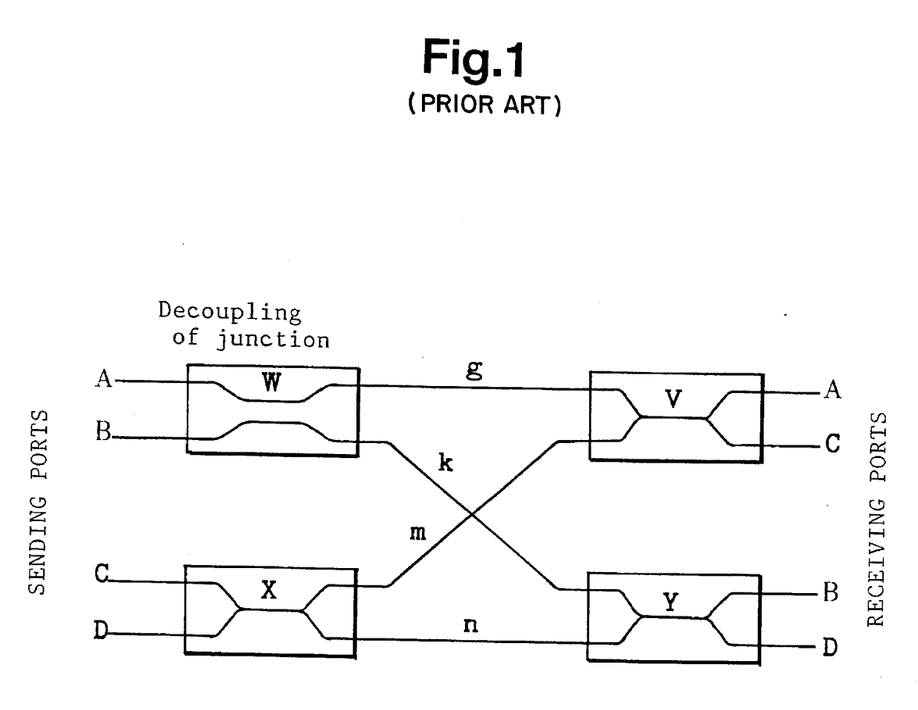
FIG. 1 is a plan view of couplers, fibers and ports for explaining the difficulty of detecting an occurrence of a trouble in a coupler in a conventional optical communication line.

FIG. 1 shows a simple example of an optical commutation line having four stations A, B, C and D. The four stations are jointed by optical fibers and couplers. Each station has a sending port and a receiving port. The station (node), the sending port and the receiving port belonging to the same station are now specified by the same symbols. Sending ports A, B, C and D are aligned on the left in FIG. 1, and receiving ports A, B, C and D are denoted on the right of the figure. Sending port A and receiving port A belong to station A. These sending ports and receiving ports are connected by optical fibers and couplers. An optical signal dispatched from an arbitrary station is sent to all the stations including the dispatching station. The system has four 2-input, 2-output couplers W, X, Y and V which are arranged in two lines by two columns (in matrix 2 ×2).

Coupler W joins sending ports A and B together and distributes an optical signal from port A or port B into two optical fibers g and k. Coupler X connects ports C and D, and gives the signal to two fibers m and n. Coupler V joints fiber g and fiber m and divides the signal from g or m in half to receiving ports A and C. Coupler Y unifies fiber k and fiber n and supplies a signal from k or n into receiving ports B and D. Therefore, an arbitrary signal from a sending port is equally distributed to all the receiving ports.

If there happens a trouble of decoupling between fibers in coupler W, the signal from sending port A is transmitted to receiving ports A and C but is not transmitted to receiving ports B and D. The decoupling induces a partial interruption of communication. But all the communication paths are not broken down by the decoupling. The signal from sending port A safely reaches receiving port A. Similarly, the signal issued from sending port B arrives at receiving port B. In all ports J (=A, B, C and D), the signal issued from the sending port J returns to the same receiving port J. Thus, all the nodes (stations) are unaware of an occurrence of the trouble of decoupling in a fiber coupler, since any signals can circulate from the sending port to the receiving port of the same node. The node will find out the trouble of the coupler by monitoring the state of transmission of signals in other stations. A node cannot always monitor the state of transmission in other nodes. Even if all the nodes are isolated from other nodes, any node cannot detect the occurrence of the troubles in the couplers. To make the explanation clear, the signal which returns to the same node is defined as a "recurring signal". The signal which propagates to other nodes is defined as a "dispersing signal". The signal which originates from node A and returns to node A is a recurring signal. The signal which arises from node A and reaches node B, C or D is a dispersing signal. Every node can detect the trouble which changes the recurring signal, but cannot detect the trouble which has no influence upon the recurring signal. In the above trouble, the decoupling of the coupler does not induce the interruption of the recurring signal. Thus, all the nodes do not notice the occurrence of the trouble.

Prior optical communication line employed the couplers having non-intersecting inputs and outputs. Thus the recurring signal travels only in the same single fiber without being transferred from a fiber to another fiber over an evanescent connection. The decoupling, that is, the separation of two fibers, invites only the interruption of the signal which is transmitted by the evanescent coupling. Namely, the decoupling of the coupler induces only the annihilation of the evanescent transmission.

A purpose of the present invention is to provide a system of detecting a trouble of a coupler in an optical communication line.

Another purpose of the present invention is to provide a system which enables all the nodes to detect a trouble by the change of the recurring signal.

SUMMARY OF THE INVENTION

The optical communication line of this invention adopts couplers having intersecting inputs and outputs. The adoption of the intersecting inputs and outputs can drastically change the relation between sending ports and receiving ports far from the prior relation.

This invention reverses the relation of the inputs and the outputs of a fiber coupler. The correspondence between the inputs (the sides of the sending ports) and the outputs (the sides of the receiving ports) is exchanged in the present invention. The intersection of the fibers shall accompany all the couplers, no matter how many couplers are used in the optical communication system. Since all the couplers have intersecting outputs and inputs, the final relation Is simply given by a product of the intersecting relation of the couplers.

The system for detecting a trouble of an optical communication line comprises a plurality of couplers having two inputs and two outputs which are connected by direct couplings or evanescent couplings, a plurality of nodes having a sending port and a receiving port, a plurality of optical fibers which connect an input of a coupler to an output of another coupler, a plurality of optical fibers which connect a sending port of a node to an input of a coupler and optical fibers which connect an output of a coupler to a receiving port of a node, wherein the couplers have intersecting inputs and outputs, and a signal issued from a node passes the direct coupling or the evanescent coupling of the couplers till the signal returns to the original node.

If a pair of fibers are decoupled in a coupler, the direct coupling is maintained, but the evanescent, indirect coupling is broken. The recurring signal issued from a sending port of a node does not return to the receiving port of the original node, if the evanescent coupling is broken by the decoupling of the coupler. Thus, each node can detect the occurrence of the trouble of the coupler.

DETAILED DESCRIPTION OF THE PREFERRED EMBODIMENTS

A simple representation is now introduced for designating the relation between the inputs and outputs of a coupler in order to simplify the explanation. The fiber coupler which has two inputs X and Y and two outputs Z and W is denoted by $(X,Y) \rightarrow (Z,W)$, when input X directly continues to output Z and input Y directly continues to output W, but input X and input Y are connected through evanescent couplings to output W and output Z, respectively. Namely, in the 2-input & 2-output coupler of $(X,Y) \rightarrow (Z,W)$, $X \rightarrow Z$ and $Y \rightarrow W$ are direct connections but $X \rightarrow W$ and $Y \rightarrow Z$ are indirect, evanescent connections.

The connections of FIG. 1 can be simply summarized in that the sending port and the receiving port of the same node are positioned on both ends of the same fiber. For example, the fiber starting from sending port A passes through point W, fiber g and point V, and reaches receiving port A of the same node. The fiber which starts from sending port C passes through point X, fiber m and point V then arrives at receiving port C or A. All the sending ports are directly connected to the receiving port of the same node.

Thus the communication line in FIG. 1 is built only by repetitions of unchanged, direct transformations $(X,Y) \rightarrow (X,Y)$ at all the couplers. Unlike the conventional one, this invention adopts intersecting linkages $(X,Y) \rightarrow (Y,X)$ at all the couplers.

The conventional coupler can be briefly specified by a matrix representation P of $$P = \begin{vmatrix} 1 & 0 \\ 0 & 1 \end{vmatrix}. \quad (1)$$

On the contrary, the coupler which this invention employs determines the connections between the inputs and the outputs in intersecting relation. Thus the coupler of the present invention is differently expressed by another matrix Q of $$Q = \begin{vmatrix} 0 & 1 \\ 1 & 0 \end{vmatrix}. \quad (2)$$

Figure 2:
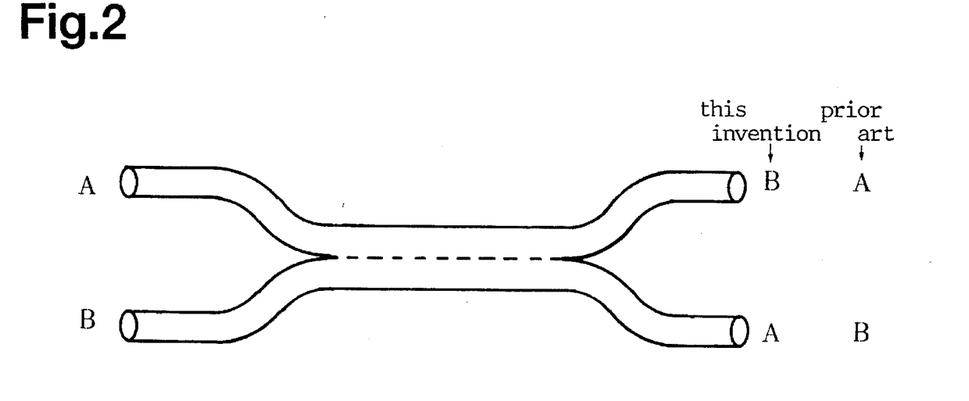
FIG. 2 is an explanatory figure of a coupler showing the allocation of the ports at the inputs and at the outputs in the conventional coupler and in the coupler proposed by the present invention.

The mode of the prior couplers is now called a "direct linkage" or a "direct method". The mode of the present invention is called an "intersecting linkage" or an "intersecting method". FIG. 2 shows the allocation of the ports of a conventional coupler and a proposed coupler in a normal state. Two optical fibers are coupled on the sides by some means. The left two ends are sending ports. The right two ends are receiving ports. The upper end of the left is now sending port A. The lower end of the left is sending port B.

The prior coupler allocates the right upper one to receiving port A and the right lower one to receiving port B.

By contrast, this invention allots the upper one to receiving port B and the lower one to receiving port A. An evanescent wave couples the sending port and the receiving port which belong to the same node. The evanescent coupling Is more fragile than the direct coupling at a trouble. The evanescent linkage is more sensitive to an occurrence of a trouble of couplers. The evanescent linkage will be broken down at the trouble with a higher possibility than the direct coupling. This invention makes the relation between the right ports and the left ports intersect in the coupler. If some trouble happens in the coupler, the intersection greatly reduces the possibility of the recurrence of signals to the same port. The intersection facilitates the detection of a disorder of couplers, since a signal issued from a port does not recur to the same port In the trouble of the coupler. Any port which is an object of consideration Is called now a "current port" or a "current node" in order to distinguish the port from the other ones. Thus the signal which returns to the current node is the recurring signal.

Figure 3:
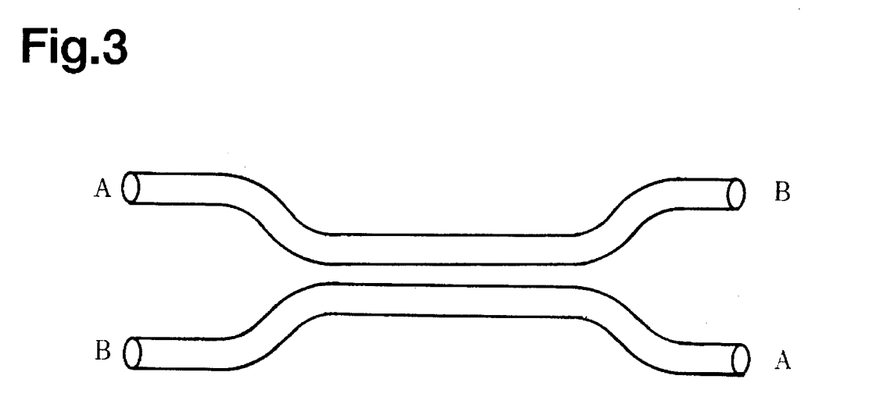
FIG. 3 is an explanatory figure of a troubled coupler whose fibers are disconnected with each other and the direct connection or evanescent connection is broken down.

FIG. 3 exhibits an example of a trouble of decoupling fibers in a coupler. The upper fiber is separated from the lower fiber. The evanescent linkage is broken down. The signal transmitted from sending port B does not return to receiving port B due to the trouble. Similarly the signal issued from the sending port A does not recur to the receiving port A. No signal recurs to the current node. Any ports can detect the occurrence of a trouble by the disappearance of the recurring signals. If the network had a conventional structure, no node could detect the trouble by itself.

Figure 4:
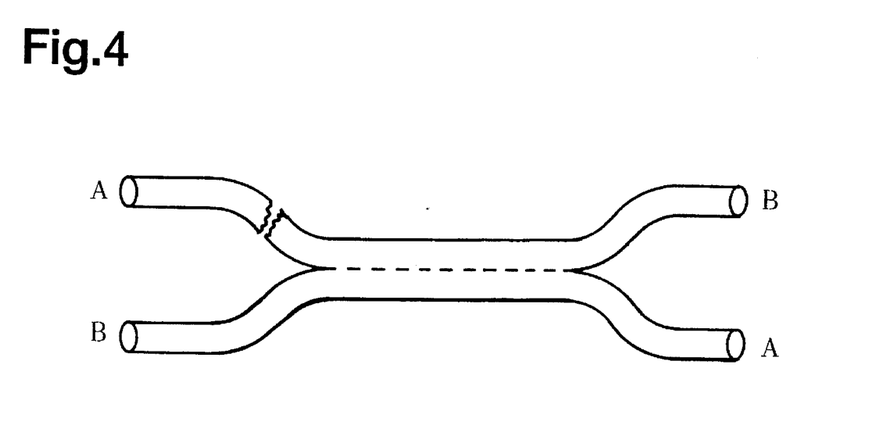
FIG. 4 is an explanatory figure of a troubled coupler having a broken fiber.

FIG. 4 denotes an example of another trouble of breakdown of a fiber. The cutting of the fiber prevents the signal out of the sending port A from recurring to receiving port A. Thus node A can detect the outbreak of the trouble by itself. The signal from sending port B arrives at receiving port B. Node B does not feel disorder. Node B cannot detect the occurrence of the trouble. There is no difference between the prior direct linkage and the present, intersecting linkage in the case of cutting of a fiber.

The difference of the trouble detection has been explained by referring to a single fiber. The same difference also holds for the case of a communication network having a plurality of couplers. An increase of nodes raises the number of the couplers. When the number n of the nodes is denoted by $n=2^K$, the network requires (nK/n 2) couplers, since K couplers in series are necessary to divide a signal to $n=2^K$ nodes and n/2 couplers in parallel are necessary to join every pair of nodes.

This invention makes the inputs and the outputs intersect in all couplers. If the coupler is expressed by the above matrix, the whole communication line can be represented by a product of the small (2×2) matrixes.

There are a lot of possibilities of the correlation between the sending ports and the receiving ports for a large K. There may be some methods for signifying the correlation between a set of sending ports and a set of receiving ports. One method is a matrix representation between the sending ports in series and the receiving ports which are connected by the same fibers to the sending ports. The matrix determines the conversion from an initial vector to a final vector. The initial vector is composed of the sending ports in series. The final vector is composed of the receiving ports connected to the sending ports by the same fibers. Since the prior network of the communication line makes all the fibers connect the sending ports and the receiving ports of the same node. Thus, the prior network can be designated simply by a unit matrix in which all orthogonal terms take "1" and all non-orthogonal terms take "0" ($a_{jj}=1$, $a_{ij}=0$, $i \neq j$). The conventional network is uniquely specified by a unit matrix, since a receiving port and its own sending port are connected by the same fiber.

This invention enjoys various possibility about the determination of the correlation between the sending ports and the receiving ports, because the couplers have intersecting linkages. For example, if four nodes constitute the communication line, the following seven matrixes denote all the possible modes of correlation between the sending ports and the receiving ports.

$$\begin{vmatrix} 0 & 1 & 0 & 0 \\ 0 & 0 & 1 & 0 \\ 0 & 0 & 0 & 1 \\ 1 & 0 & 0 & 0 \end{vmatrix} \begin{vmatrix} 0 & 1 & 0 & 0 \\ 0 & 0 & 0 & 1 \\ 1 & 0 & 0 & 0 \\ 0 & 0 & 1 & 0 \end{vmatrix} \begin{vmatrix} 0 & 0 & 1 & 0 \\ 0 & 0 & 0 & 1 \\ 1 & 0 & 0 & 0 \\ 0 & 1 & 0 & 0 \end{vmatrix} \begin{vmatrix} 0 & 0 & 1 & 0 \\ 1 & 0 & 0 & 0 \\ 0 & 0 & 0 & 1 \\ 0 & 1 & 0 & 0 \end{vmatrix} \quad (3)$$

$$\begin{vmatrix} 0 & 0 & 0 & 1 \\ 0 & 0 & 1 & 0 \\ 1 & 0 & 0 & 0 \\ 0 & 1 & 0 & 0 \end{vmatrix} \begin{vmatrix} 0 & 0 & 0 & 1 \\ 0 & 0 & 1 & 0 \\ 0 & 1 & 0 & 0 \\ 1 & 0 & 0 & 0 \end{vmatrix} \begin{vmatrix} 0 & 0 & 1 & 0 \\ 0 & 0 & 0 & 1 \\ 1 & 0 & 0 & 0 \\ 0 & 1 & 0 & 0 \end{vmatrix}$$

Figure 5:
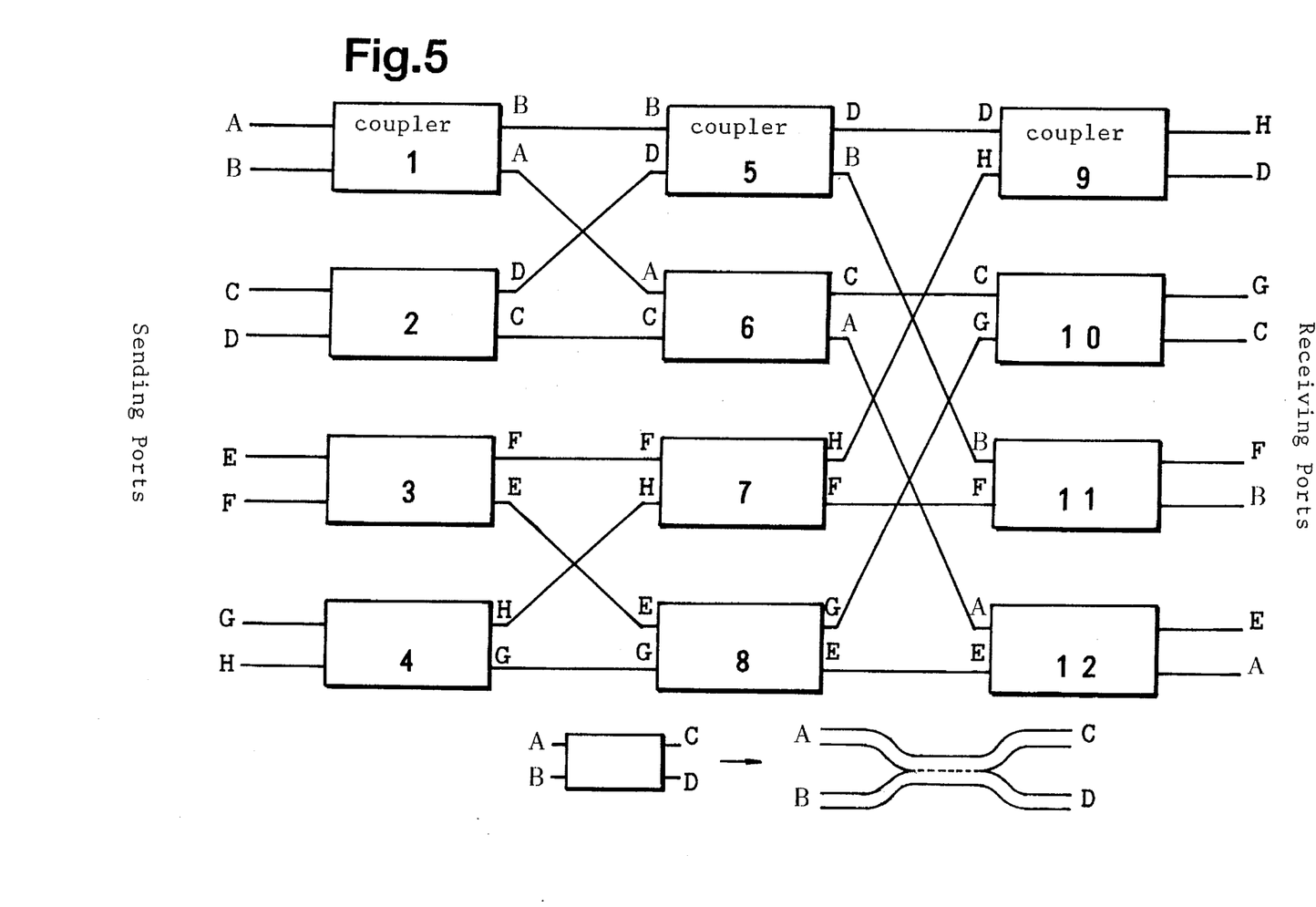
FIG. 5 Is a schematic view of the distribution of the couplers having eight sending ports and eight receiving ports in the present invention.

FIG. 5 shows an example of the communication system of the present invention. This is an example of eight inputs and eight outputs. The eight nodes are specified by A, B, C, D, E, F, G and H. Here n=8, K=3. Then nK/2=12. Twelve couplers are necessary to combine these ports. This is only an example. In general, if the communication line includes $n=2^K$ ports, n/2 couplers will be arranged in column and K couplers will be aligned in line. The total number of the couplers is nK/2. Preferably, the number n of the ports (nodes) can be expressed by $n=2^K$, where K is a positive integer. Thus 2, 4, 8, 16, 32, 64 or so is desirable for the number n of the nodes.

In FIG. 5, all the couplers have two inputs and two outputs. The bottom figure shows the mode of connection in the coupler which is denoted simply by a rectangle. The upper input directly leads to the upper output and the lower input is directly connected to the lower output in the rectangle. If the fibers are decoupled, the transmissions AD and BC are held up. The couplers are numbered by integers from 1 to 12.

The fibers are not twisted in all the couplers in the representation in FIG. 5. The fiber passes through the couplers straight. All the fibers can be traced easily. The first fiber is denoted by line ABBDDH. The second fiber is BAACCG. The third fiber is CDDBBF. The fourth fiber is DCCAAE. The fifth fiber is EFFHHD. The sixth fiber is designated by FEEGGC. The seventh fiber is GHHFFB. The eighth fiber is HGGEEA. The trace of the fibers is, however, meaningless in the invention.

Coupler 1 has inputs A and B and outputs B and A in this order. The inputs A and B have a clear meaning as sending ports A and B. The symbols at the outputs do not have a clear meaning, because the outputs are not receiving ports but only intermediate steps. Of course, output B of coupler 1 receives also both signals from port A and port B. Output A receives both signals from ports A and B. But the output is specified only by one symbol which shows the evanescent, indirect transmission of the recurring signal.

The symbols of the outputs denote the evanescent or indirect coupling to the sending ports. In coupler 1, output B means that it is connected to sending port B by an evanescent coupling. The signal from node B is sent through evanescent coupling to output B of coupler 1. The path of any recurring signal can be identified by tracing the same characters denoted on sides of the couplers. For example, a signal from node B recurs to node B via BBBBBB in series through couplers 1, 5 and 11. The recurring signal passes any coupler by the indirect coupling. Thus the symbols of the outputs are reverse to the symbols of the inputs in all the couplers.

Coupler 2 has inputs C and D and output D and C in the intersecting relation. The recurrent signal is transmitted also by the indirect coupling in coupler 2. Similarly coupler 3 has inputs E and F and outputs F and E in the reverse order. Coupler 4 has inputs G and H and outputs H and G also in the reverse order.

Similarly, the couplers 5, 6, 7 and 8 on the second column exchange the inputs and the outputs. The couplers 9, 10, 11, and 12 also exchange the inputs and the outputs. The symbols A, B, C and D are indicated to the outputs which are connected by the indirect coupling to the input of the same symbols. The allocations of the symbols are uniquely determined in the example. Finally, the outputs of the couplers are numbered as H, D, G, C, F, B, E and A. The receiving ports shall be allocated to the port of the same symbols as sending ports. In the network, all signals pass three fiber couplers and are dispersed into all the 8 receiving ports. Thus, there are different 64 paths of transmission of signals from the sending ports to the receiving ports.

Eight paths of the 64 paths includes three direct linkages which are connected by the fibers themselves. The prior method allotted both ends of each of the eight paths to the sending ports and to the receiving ports of the same nodes. Other 24 paths of the 64 paths include two direct linkages and one indirect linkage. Further 24 paths include one direct linkage and two indirect linkages. Last eight paths include three indirect (evanescent) linkages. This invention employs the last category of paths which include no direct linkage for conveying the recurring signals. In the present invention, all the recurring signals pass the indirect linkages of the three couplers. If one of the couplers is decoupled, two recurring signals extinguish. Then two nodes can detect the occurrence of the trouble by the extinction of the recurrence of the signal within the nodes.

Figure 6:
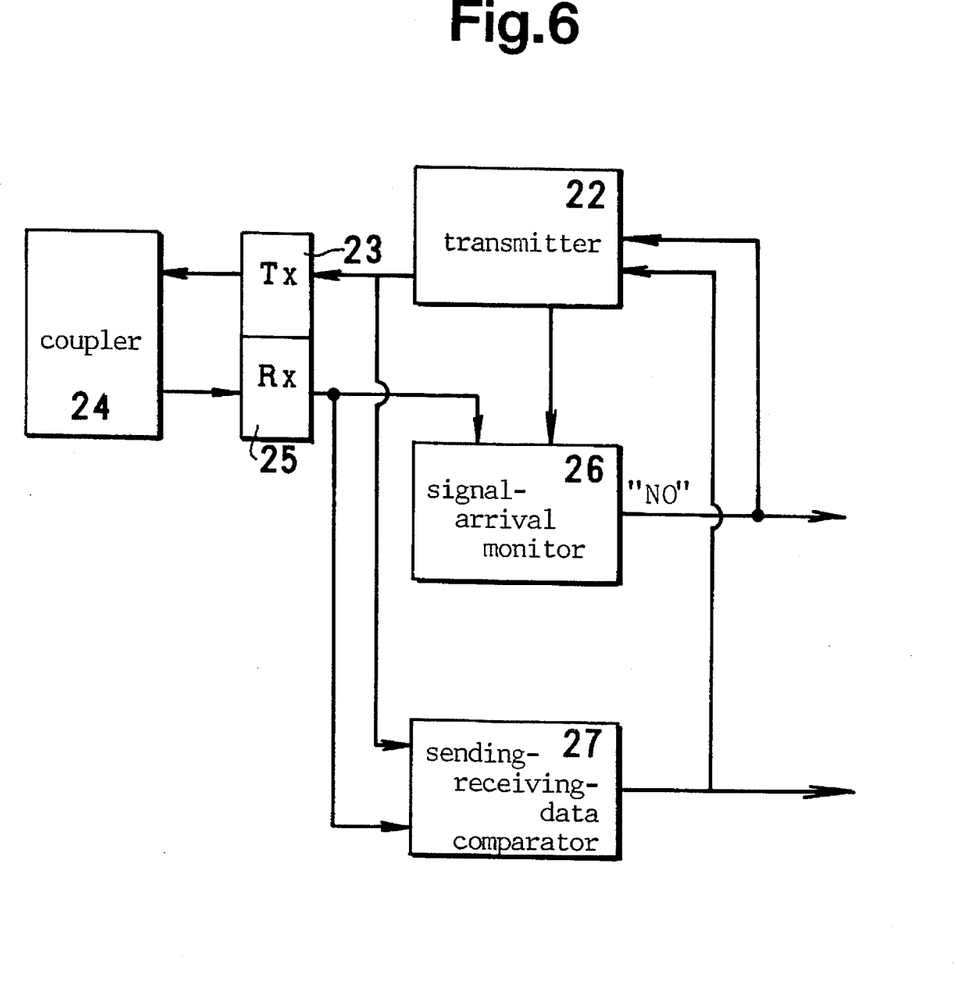
FIG. 6 is an example of a circuit for detecting a trouble of a coupler by sending a signal from the sending port of a node, inspecting whether the same signal returns to the receiving port of the same node, judging the communication system in trouble when the signal does not return, and ending the sending of data.

An example of a detection device of trouble is explained by referring to FIG. 6 which shows one node having a receiving port and a sending port. A communication network contains a plurality of equivalent nodes. In the node, a transmitter (22) makes the data which shall be sent in the communication line. The data are digital, electric signals. The data are converted from electric signals into optical signals by an E/O converter (23). The optical signals are sent to a coupler (24) which introduces the signals into the fiber paths as shown in FIG. 5. The signals are transmitted to all the nodes including the own node(recurring signals). Here, the problem is the recurring signals. The recurring signals pass the intersecting (evanescent) linkages of the couplers and return to the coupler (24) of the same port. The signals go through an optical fiber and arrive at an 0/E converter (25). The optical signals are converted into electric signals at the O/E converter (25). A signal-arrival monitor (26) checks whether the sending signal is returning to receiving port of the same node. The transmitter (22) gives a starting signal to the signal-arrival monitor (26), when the transmitter (22) issues a signal into the communication line. In a normal state, the recurring signal accompanies the starting signal with a delay which originates from the circulation of the signal in the network. When the recurring signal does not return to the signal-arrival monitor (26) at the same time of the starting signal, some trouble must happen at some couplers or some fibers. In the case of "No" recurring signal, the signal-arrival monitor (26) sends out a suspending signal to the transmitter (22). The transmitter (22) stops sending the signal.

A sending-receiving-data comparator (27) compares the received data with the sent data. The receiving data should coincide with the sending data in a normal state. If the receiving data differs from the sending data, a trouble must occur in the optical communication system. The signal-arrival monitor (26) and the sending-receiving-data comparator (27) investigate the state of the current node. When the monitor (26) or the comparator (27) detect some trouble, the current node should be separated from the communication system in order to forbid the trouble from having a serious influence upon the other nodes.

This invention enables a node to detect an occurrence of a trouble precisely by itself. The contrivance lies in the adoption of the evanescent linkages in couplers for the transmission paths of recurring signals which are issued from a node and return to the same node.

The optical communication line of the invention can be applied, for example, to the LANs in automobiles. In the communication line, a plurality of ports (or nodes) are connected by optical fibers. The junction of the nodes is a star-type. The communication system can employ various types of couplers with 2 inputs and 2 outputs.

Figure 7:
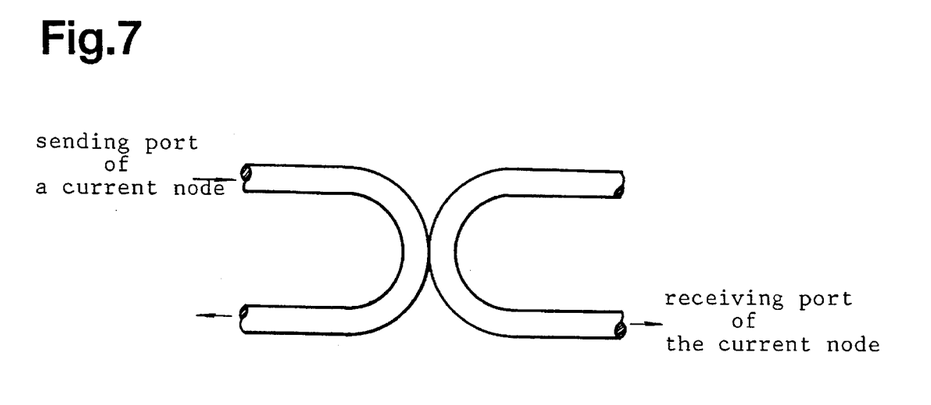
FIG. 7 is a simplified view of a bending fiber type coupler making the best use of the coupling by the leak light at the bends of fibers.

FIG. 7 shows an example of bending fiber leak type couplers. A housing and a means of fixing fibers are omitted in the figure. Two fibers are forcibly bent and are joined at the bent sides. The extreme bending gives rise to a leak of light from the side of the fiber, since the mode in the core of the fiber is converted from a propagating mode to a dissipation mode. The coupler makes the best use of the leak on the bend sides. Light leaks from the side of a fiber and enters to the core of the other fiber. This is one of evanescent couplings. In the coupler, a current sending port is not coupled by a direct connection to the current receiving port but is coupled by an evanescent linkage to the port. This mode of connection is briefly denoted by the matrix Q of Eq.(2).

Figure 8:
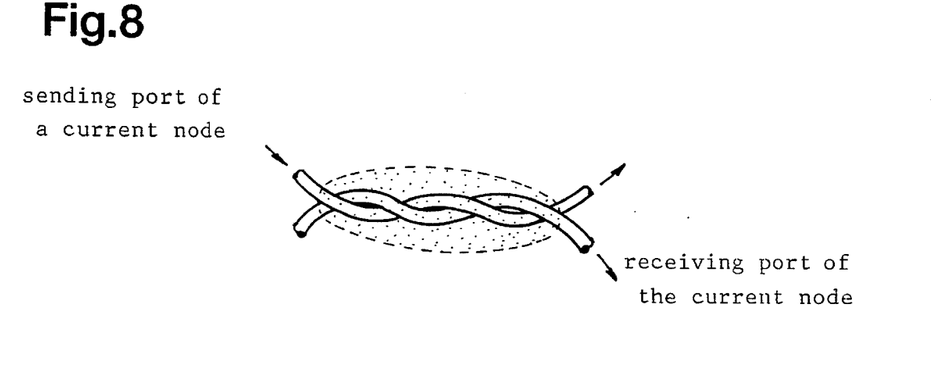
FIG. 8 is a view of a twisting fiber type coupler which induces an evanescent connection between the twisting fibers.

FIG. 8 exhibits an example of fiber-twisting type couplers. The coupler is produced by the steps of melting parts of two fibers, stretching the molten parts of the fibers, twisting the fibers, drawing the core of a fiber to the core of the other fiber and coating the junction by a high refractive index material. Since the distance between cores is so short that two fibers are connected evanescently. The current sending port is not coupled by a direct connection to the current receiving port but is joined by an evanescent linkage. The connection is also designated by the matrix Q of Eq.(2).

Figure 9:
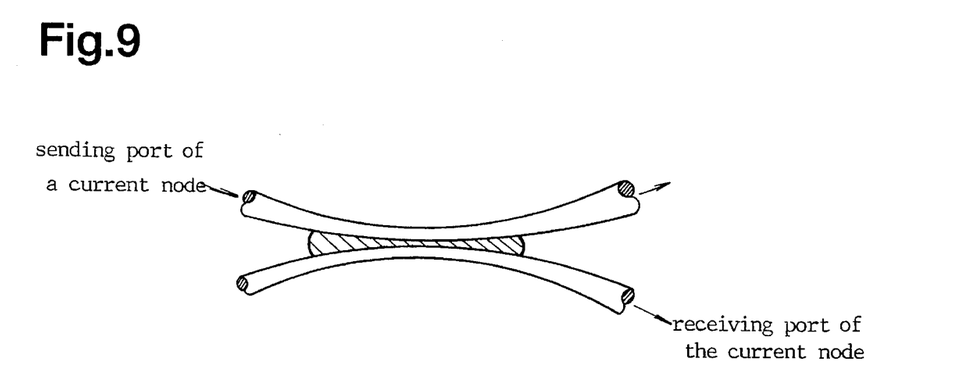
FIG. 9 is a view of a high refractive index material type coupler which has a high refractive index material sandwiched between two stretched, side-polished fibers.

FIG. 9 shows an example of high refractive index material type couplers. The coupler is produced by melting parts of fibers, stretching the molten parts and sandwiching a high refractive index material between the stretched fibers. Otherwise, the coupler is made by melting parts of fibers, stretching the molten parts for thinning the parts, polishing sides of the thinning parts till the cores and sandwiching a high refractive index material between the polished sides of the fibers. Two fibers are coupled by an evanescent linkage. In this case also, the current sending port and the receiving ports are allocated to the intersection positions.

Figure 10:
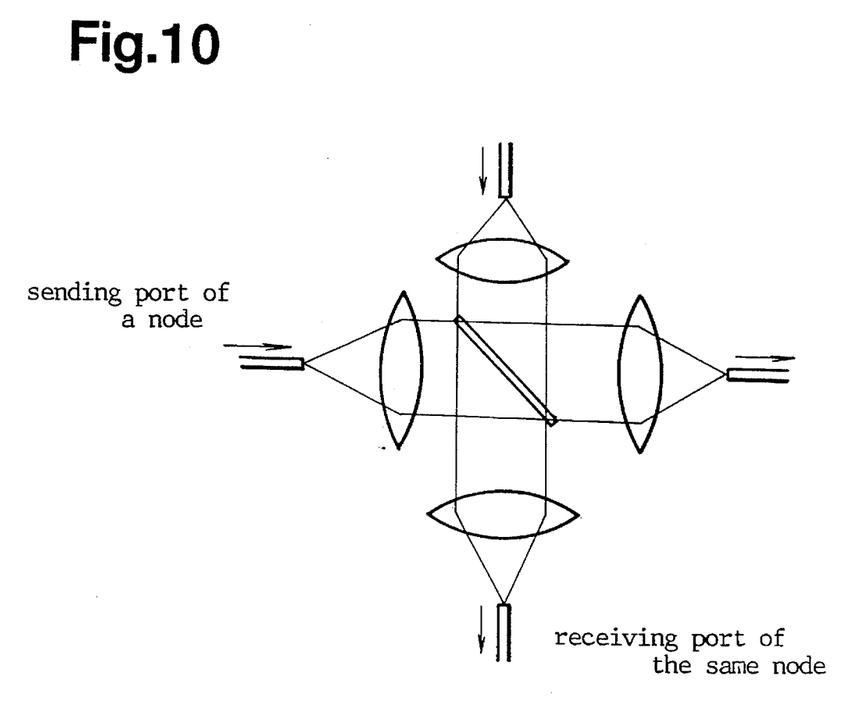
FIG. 10 is a beam splitter type coupler which divides light beams into halves by a beam splitter.

FIG. 10 denotes an example of beam splitter type couplers. The coupler is composed of lenses and a beam splitter. The light beams emitted from two input fibers are converted into wide parallel beams. The wide beams are converged by other lenses to the cores of the other fibers. The beam splitter divides the beams into passing beams and reflected beams. The reflected beams are included into the category of the evanescent, indirect coupling, because the reflected beams vanish, when the beam splitter is removed.

Figure 11:
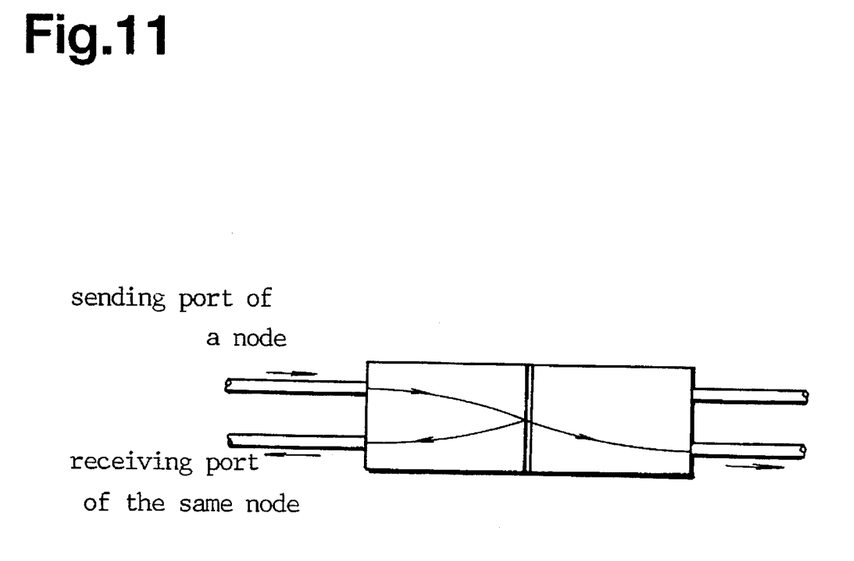
FIG. 11 is a rod-lens type coupler which is built with a selfoc lens and a reflection film.

FIG. 11 shows an example of selfoc rod lens & reflective film type couplers. "Selfoc" means a structure of a transparent medium having a center of higher refractive index and a periphery of lower refractive index. Two ¼ wavelength long lenses are glued to each other via a middle half-reflection film. Two ports are stuck on a end of the lenses and two other ports are stuck on another end of the lenses. The light entering the lens from the left, upper port bends inward and attains the center of the half-reflection film. A part of the light is reflected by the film and goes out from the left, lower port. The other part of the light passes the film and exits from the right lower port. The upper ports are connected to the lower left port by the reflection film. Thus, this connection is deemed to be an evanescent linkage, since the light will vanish, if the reflection film is broken down. The left, upper port is allocated to the current sending port and the left, lower port is assigned to the current receiving port according to the teaching of the present invention. In general, the current sending port and the current receiving ports should be allocated to the pair of ports which are more liable to be damaged at a trouble.

Figure 12:
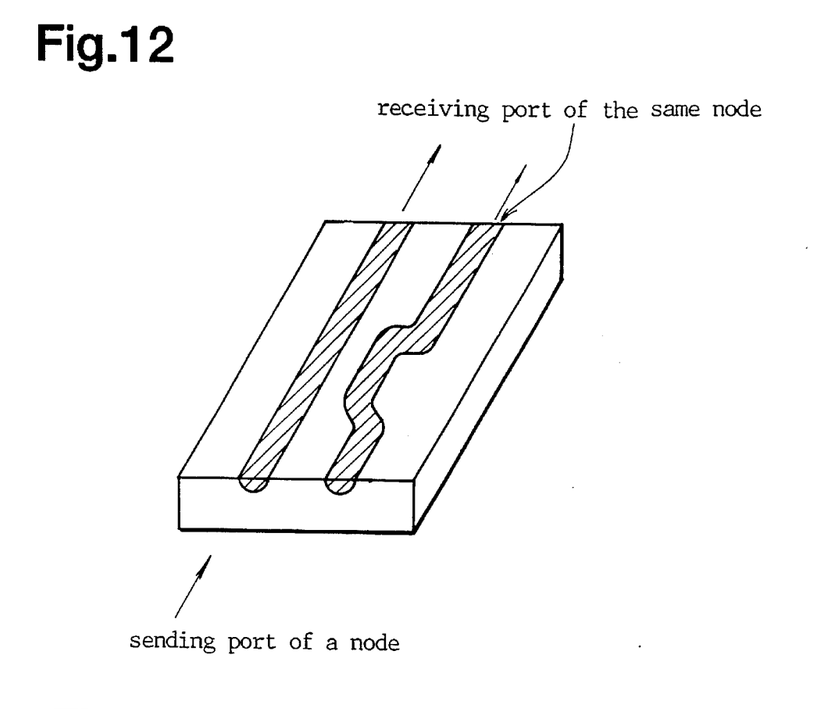
FIG. 12 is a waveguide type coupler which has a substrate and waveguides formed on the substrate.

FIG. 12 exemplifies a waveguide type coupler to which this invention can be applied. The coupler has a substrate and two optical waveguides on the substrate. The waveguides are produced by doping an impurity to the substrate and by making regions with higher refractive index. Two waveguides come close to each other at a part on the substrate. In the proximate region, the field intensity distributions of two waveguides overlap. The overlap allows an evanescent coupling between the waveguides. A pair of ports of intersecting relation are allocated to the current sending port and the current receiving ports. If the waveguides degrade and the evanescent linkage is abated, the recurring signal vanishes.

The extinction of the recurrence notifies the occurrence of a trouble to the node.

Figure 13:
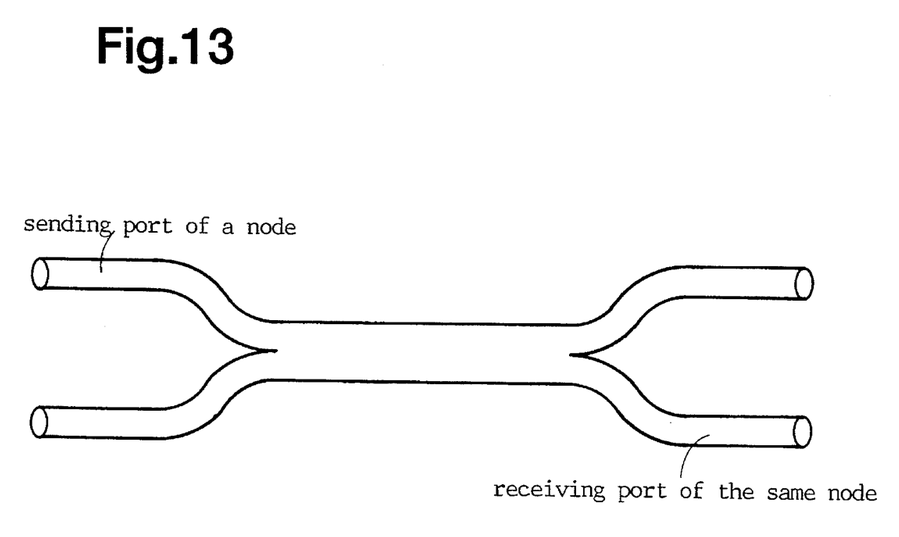
FIG. 13 is a molten fiber type coupler which is made by melting and unifying fibers on the sides.

FIG. 13 shows an example of fused-fiber type couplers which are produced by melting parts of two fibers, and sticking the molten parts to each other. In the coupler, the cores of two fibers are directly connected. The current sending port and the current receiving port are allotted at the positions in the intersecting relation. In a normal state, a signal entering the coupler from an input is divided into two outputs equally. In a trouble of the coupler, the evanescent coupling is broken down and the current receiving ports are disconnected from the current sending ports of the same node.

This invention can be applied to any types of fiber couplers. In any case, the allotment of the ports is exchanged in inputs and outputs in order to connect a sending port to the receiving port of the same node with the weaker coupling which is liable to be disconnected at a trouble.

The advantages of the present invention are now explained. This invention enables a node in an optical communication line to detect an occurrence of a trouble by itself from the abnormality within the node. Since the node finds out the trouble, the node which suffers from the trouble can be separated immediately from the whole communication system for preventing the trouble from having a bad influence upon other nodes. Then the troubled node can be repaired in the separated state. The present invention succeeds in building an optical communication line with higher reliability by notifying individual nodes of an occurrence of a trouble and of a necessity of repair.

It is effective to adopt the optical communication system of the present invention as a network of the controlling information in automobiles, airplanes or trains or as an information network in a factory in which the network will be exposed in corrosive environments.

What we claim is:

1. A system of detecting troubles in an optical communication line comprising:

a plurality of couplers having two inputs and two outputs which are connected one of directly and evanescently to the inputs, a plurality of nodes having a sending port and a receiving port for exchanging signals among all nodes, optical fibers connecting the sending ports of the nodes to the inputs of the couplers, optical fibers connecting the outputs of the couplers to the receiving ports of the nodes, optical fibers connecting the input of one of the couplers to the output of the other of couplers for distributing a signal issued from any node to all the nodes, wherein the couplers have intersecting inputs and outputs, the sending port of a node is connected in series by evanescent linkages of the couplers to the receiving port of the same node, when the evanescent linkage is decoupled, a recurring signal from a sending port of a node does not return to the receiving port of the same node, and the node notices an occurrence of a trouble by the extinction of the recurring signal.

2. A system as claimed in claim 1, wherein the number n of the nodes is $n=2^K$, where K is an integer, and the couplers are arranged in a matrix of n/2 lines and K columns.

3. A system as claimed in claim 1, wherein the number n of the nodes is $2^{K-1}<n\leq2^K$, where K is an integer, and the couplers are arranged in a matrix of n/2 lines and K columns.

4. A system as claimed in claim 1, wherein the coupler is a bending fiber leak type coupler which is produced by bending two fibers and joining bending ports of the fibers for exchanging leak light wave between the bending fibers.

5. A system as claimed in claim 1, wherein the coupler is a fiber-twisting type coupler which is produced by melting parts of two fibers, stretching the melted parts, twisting melted parts of the fibers for exchanging light between two fibers through an evanescent linkage.

6. A system as claimed in claim 1, wherein the coupler is a high refractive index type coupler which is made by melting parts of two fibers, stretching the melted fibers, sandwiching a high refractive index material by the stretched parts of the fibers for exchanging light between two fibers through an evanescent linkage.

7. A system as claimed in claim 1, wherein the coupler is a beam splitter type coupler which comprises four lenses and one beam splitter.

8. A system as claimed in claim 1, wherein the coupler is a selfoc lens and reflection film type coupler having two ¼ wavelength selfoc lenses and a half-reflection film sandwiched between the lenses.

9. A system as claimed in claim 1, wherein the coupler is a waveguide type coupler which has a substrate and two waveguides formed on the substrate.

10. A system as claimed in claim 1, wherein the coupler is a fused-fiber type which is produced by melting parts of two fibers and gluing the sides of the melted parts of the fibers together.

* * * * *